United States Patent
Kurita et al.

[11] Patent Number: 5,855,651
[45] Date of Patent: *Jan. 5, 1999

[54] METHOD FOR PROCESSING WASTE GAS EXHAUSTED FROM CHEMICAL VAPOR AND DEPOSITION EQUIPMENT

[75] Inventors: Naoyasu Kurita; Takayoshi Azumi; Kazuhisa Onozawa; Tsuyoshi Watanabe; Mitsutoshi Sasajima; Naoki Yamada, all of Tokyo, Japan

[73] Assignee: Asahi Denka Kogyo K.K., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 966,176

[22] Filed: Nov. 7, 1997

Related U.S. Application Data

[63] Continuation of Ser. No. 560,373, Nov. 17, 1995, abandoned.

[30] Foreign Application Priority Data

Nov. 29, 1994 [JP] Japan .................................. 6-295158
May 8, 1995 [JP] Japan .................................. 7-109696

[51] Int. Cl.⁶ .................................................. B01D 46/04
[52] U.S. Cl. .............................. 95/280; 55/302; 55/338; 95/285; 96/189; 96/373
[58] Field of Search ..................... 55/302, 338; 95/279, 95/280, 285; 96/189, 372, 373

[56] References Cited

U.S. PATENT DOCUMENTS

| | | | |
|---|---|---|---|
| 3,995,005 | 11/1976 | Teller | 55/262 |
| 4,010,013 | 3/1977 | Murayama | 55/262 |
| 4,070,162 | 1/1978 | Kober et al. | 55/262 |
| 4,097,251 | 6/1978 | Murayama et al. | 55/262 |
| 4,273,750 | 6/1981 | Hollett, Jr. et al. | 55/262 |
| 4,319,890 | 3/1982 | Teller et al. | 55/262 |
| 4,728,342 | 3/1988 | Abom | 55/262 |
| 4,865,629 | 9/1989 | Zievers et al. | 55/262 |
| 5,022,897 | 6/1991 | Balcar et al. | 55/262 |

FOREIGN PATENT DOCUMENTS

| | | | |
|---|---|---|---|
| 2236030 | 2/1973 | Germany | 55/262 |
| 54-156274 | 12/1979 | Japan . | |
| 62-291625 | 12/1987 | Japan . | |
| 62-294416 | 12/1987 | Japan . | |
| 63-291625 | 11/1988 | Japan . | |
| 1-23168 | 5/1989 | Japan . | |
| 1-258718 | 10/1989 | Japan . | |
| 3-229609 | 10/1991 | Japan . | |
| 4-180568 | 6/1992 | Japan . | |
| 5-192534 | 8/1993 | Japan . | |
| 5-261232 | 10/1993 | Japan . | |
| 5-263248 | 10/1993 | Japan . | |
| 6-226023 | 8/1994 | Japan . | |
| 6-57289 | 8/1994 | Japan . | |
| 7611236 | 4/1977 | Netherlands | 55/262 |
| 1501866 | 2/1978 | United Kingdom | 55/262 |

*Primary Examiner*—C. Scott Bushey
*Attorney, Agent, or Firm*—Oblon, Spivak, McClelland, Maier & Neustadt, P.C.

[57] ABSTRACT

A method of processing waste gas exhausted from chemical vapor deposition equipment, which entails:

a) contacting a waste gas containing viscous substances with a filtering aid agent, b) passing the waste gas containing the viscous substances exhausted from the chemical vapor deposition equipment, and which has been contacted with the filtering aid agent, through a filtering and dust collecting unit, whereby the viscous substances are condensed with the filtering aid agent on the filtering and dust collecting unit, and c) removing the condensed matter from the surface of the filter, thereby preventing clogging thereof.

8 Claims, 3 Drawing Sheets

METHOD FOR PROCESSING WASTE GAS EXHAUSTED FROM CHEMICAL VAPOR AND DEPOSITION EQUIPMENT

This application is a continuation of application Ser. No. 08/560,373, filed on Nov. 17, 1995, now abandoned.

BACKGROUND OF THE INVENTION

1. Field of the Invention

The present invention relates to a method and apparatus for processing waste gas exhausted from chemical vapor deposition (CVD) equipment whereby a dust and/or viscous substances are separated and removed from the waste gas exhausted from the CVD equipment.

2. Description of the Prior Art

CVD is one of the semiconductor processing techniques used to form a thin film. In the CVD technique, one or more compounds such as halides, sulfides, or hydrides or other simple gases containing the elements for comprising the thin film to be formed are supplied onto a substrate so that the desired thin film is deposited on the substrate by means of a chemical reaction (such as thermal decomposition, oxidation, reduction, polymerization, vapor phase reaction, etc. at a high temperature) occurring in a vapor phase or on the surface of the substrate. As the CVD technique is based on a chemical reaction, it is possible to form a thin film of a wide variety of elements. It is also possible to obtain an arbitrary composition by properly selecting the combination of materials used for the vapor phase reaction. Therefore, the CVD technique can be used to synthesize a film having an entirely new structure and/or composition which has not been known conventionally. The CVD technique has a further advantage that a thin film can be formed at a temperature much lower than the melting point of the film material.

For example, the CVD technique is used to form a $SiO_2$ film on a Si substrate or the like by supplying a raw material such as $SiH_4$ (mono-silane) or tetraethoxysilane (TEOS) onto the substrate. The CVD equipment exhausts waste gas that includes not only the unreacted gas which made no contribution to the formation of the film but also dust, such as particles of $SiO_2$, and by-products of the film formation process such as alcohol, aldehyde, and highly viscous polysiloxane, etc. Many of these components in the waste gas are hazardous and therefore, it is prohibited to directly release the waste gas into the atmosphere so as to protect humans and the environment from any negative effects.

There are various known techniques for processing the waste gas exhausted from CVD equipment. For example Japanese Patent Laid-Open No. 5-261232 discloses as a wet-type apparatus, a scrubber for processing the waste gas exhausted from atmospheric-pressure CVD equipment which is adapted to spray cleaning water containing an anionic surface-active agent or nonionic surface-active agent through a shower nozzle of the scrubber.

Japanese Patent Laid-Open No. 3-229609 discloses a dry-type apparatus for processing the waste gas exhausted from CVD equipment in such a manner that the solid components contained in the waste gas exhausted from the CVD equipment are collected in the form of particles and disposed of, wherein the waste gas is cooled without using a water shower so that the particles are deposited on the surface of a plurality of layers of wire mesh provided in an exhaust path of the waste gas, and the particles are sucked up and disposed of by a vacuum cleaner.

However, in the wet technique disclosed in Japanese Patent Laid-Open No. 5-261232, the apparatus produces waste containing dust and highly toxic gas, and thus an after-treatment is required. In the example disclosed in Japanese Patent Laid-Open No. 3-229609, the technique requires an apparatus for cooling the waste gas at a rate of 4 to 5 $m^3$/min for each piece of CVD equipment so that the solid particles are changed into a powder form. For example, when waste gas containing a great amount of dust and highly-viscous substances such as polysiloxane produced during an atmospheric-pressure CVD process is collected and recovered, the highly-viscous substances are deposited on the surface of the wire mesh, and it is very difficult to remove the deposited highly-viscous substances by means of suction using a vacuum cleaner. Furthermore, the highly-viscous substances also deposit on the inner wall of the pipe connected to the vacuum cleaner, which leads to a reduction in its suction capabilities. Therefore, this technique cannot provide high efficiency in waste gas processing.

It is therefore an object of the present invention to provide a method and apparatus for processing waste gas exhausted from CVD equipment which overcomes the above described problems.

SUMMARY OF THE INVENTION

According to an aspect of the invention, there is provided a method of processing waste gas exhausted from chemical vapor deposition equipment, including the step of introducing a waste gas containing dust and/or viscous substances exhausted from the chemical vapor deposition equipment into a filtering and dust collecting unit thereby separating and removing the dust and/or viscous substances from the waste gas. This method is characterized in that the waste gas comes in contact with a filtering aid agent so that the dust and/or viscous substances are condensed as condensed matter on the filtering aid agent, thereby preventing the dust and/or viscous substances from depositing directly on a filter of the filtering and dust collecting unit.

According to another aspect of the invention, there is provided an apparatus for processing waste gas exhausted from chemical vapor deposition equipment, the apparatus comprising: a filtering and dust collecting unit disposed in the middle of a flow path of the waste gas exhausted from the chemical vapor deposition equipment, the filtering and dust collecting unit having a filter for separating and removing dust and/or viscous substances contained in the waste gas exhausted from the chemical vapor deposition equipment; a gas processing tower for detoxifying the waste gas from which the dust and/or viscous substances have been removed by the filtering and dust collecting unit; and an exhaust fan. The apparatus is characterized in that it further comprises a filtering aid agent supply unit for adding a filtering aid agent, the filtering aid agent supply unit being disposed between the chemical vapor deposition equipment and the filtering and dust collecting unit, or otherwise disposed on the filter and dust collecting unit.

DETAILED DESCRIPTION OF THE INVENTION

Figure 1:
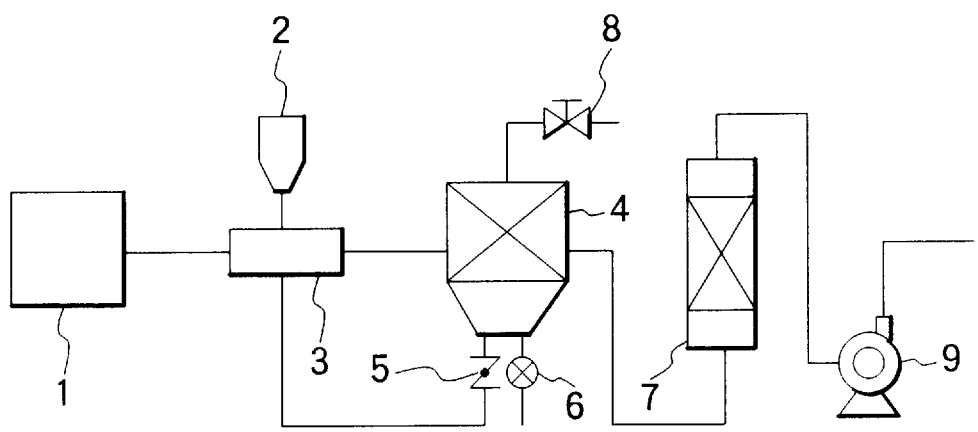
FIG. 1 is a schematic diagram of a first embodiment of an apparatus for processing waste gas exhausted from CVD equipment according to the present invention.

In the method and apparatus for processing the waste gas exhausted from CVD equipment according to the present invention, the waste gas containing dust and/or viscous substances exhausted from the CVD equipment is mixed with a filtering aid agent so that the dust and/or viscous substances are condensed onto the filtering aid agent, thereby preventing the filter disposed in a filtering and dust collecting unit (unit for separating gas and solids) from being clogged and thus making it possible to quickly and effectively process the waste gas.

The term "dust and/or viscous substances" is used here to refer to a wide range of substances such as lower alcohols, lower aldehydes, carbon monoxide, silicon compounds, phosphorus compounds, boron compounds, etc., and mists of these substances.

In the present invention, the filtering aid agent is preferably perlite, diatomaceous earth, or activated carbon. The type and size of the filtering aid agent are preferably selected depending on the size of the filter mesh and the size of the dust so that the dust may be effectively collected.

The filtering aid agent may of course, be a new, or the used filtering aid agent may be withdrawn from the filtering and dust collecting unit and recycled. A mixture of new and recycled filtering aid agents may also be employed.

To effectively cohere the dust and/or viscous substances onto the filtering aid agent, it is also preferable that the filtering aid agent be supplied continuously or at a fixed interval by means of a circulating and mixing unit which is disposed in a waste gas circulation line.

Furthermore, it is also preferable that a compressed gas regulator valve be provided for introducing a compressed gas into the filtering and dust collecting unit to therein back-wash the filter. The method of removing the dust from the filter, is not limited to back-washing the filtering and dust collecting unit as described above, as other methods, such as mechanical vibration or pulse air methods may also be employed.

Furthermore, the material, shape, and type of filter in the filtering and dust collecting unit is not particularly limited. For example, various materials such as synthesized fibers, glass fibers, wire mesh, etc. may be selected and employed according to the dust removing method.

According to another aspect of the present invention, only a filtering aid agent is circulated before processing the waste gas exhausted from CVD equipment so that the filter in the filtering and dust collecting unit is coated with the filtering aid agent (hereafter, this processing is referred to as "pre-coating"), and then the processing of the waste gas proceeds. This prevents any trace amounts of dust and/or viscous substances from directly depositing onto the filter of the filtering and dust collecting unit. As a result, it is possible to process the waste gas more effectively and more quickly. In the case where the filter in the filtering and dust collecting unit is pre-coated with a filtering aid agent, the waste gas of the CVD equipment may be introduced directly to the filtering and dust collecting unit without adding any further filtering aid agent to the waste gas.

When the filter in the filtering and dust collecting unit is pre-coated with a filtering aid agent, air may also be introduced into the filtering and dust collecting unit so as to effectively diffuse the filtering aid agent. In this case, the air for diffusing the filtering aid agent is introduced through a path different from that through which the waste gas flows. More specifically, it is preferable that the air be introduced at a position lower than the filter in the filtering and dust collecting unit, that is, it is preferable to introduce the air in an upstream region for effective diffusion of the filtering aid agent. Furthermore, it is preferable that the air for diffusing the filtering aid agent be introduced directly into the filtering and dust collecting unit, and it is also preferable that the air be introduced after being heated and dried with a heater or the like.

In the technique in which the CVD equipment waste gas containing dust and/or viscous substances is contacted with a filtering aid agent so that the dust and/or viscous substances are condensed as condensed matter on the filtering aid agent thereby preventing the filter in the filtering and dust collecting unit from being clogged, although the dust and/or viscous substances are not deposited directly on the surface of the filter, the condensed matter consisting of the filtering aid agent and the dust and/or viscous substances is deposited on the surface of the filter and the filtering ability of the filter is gradually lowered due to this deposition. The condensed matter contains alcohols, aldehydes, etc., produced as by-products of the CVD process and is generally so viscous that it is difficult to sufficiently remove the condensed matter by means of conventional back-washing. In the present invention, air is introduced from the outside to dry the condensed matter so that the condensed matter may be easily removed from the surface of the filter by means of mechanical vibrations or air compression. This makes it possible to more effectively and quickly process the waste gas.

The air is preferably introduced from the outside directly to the main part of the filtering and dust collecting unit. It is also preferable that the air is heated at a temperature in the range of from 50° to 100° C. by means of a heater or the like so that the air is low in humidity. The air is preferably introduced directly into the filtering and dust collecting unit via a path different from that through which the waste gas flows. Furthermore, the air is preferably introduced into the filtering and dust collecting unit via an inlet disposed lower than the filter, that is, it is preferable to introduce the air into an upstream region. It is not necessary to continuously introduce the air. Furthermore, the air may be introduced via the same path as that through which air is introduced when the pre-coating of the filtering aid agent is performed.

In another aspect of the invention, when waste gas containing dust and/or viscous substances exhausted from CVD equipment is introduced into the filtering and dust collecting unit to separate and remove the dust and/or viscous substances, the waste gas comes in contact with the filtering aid agent so that the dusty and/or viscous substances are condensed as condensed matter on the filtering aid agent, thereby preventing the dust and/or viscous substances from directly depositing on the filter in the filtering and dust collecting unit, wherein air is introduced into the filtering and dust collecting unit so as to dry the filter and the condensed matter consisting of the dust and/or viscous substances and the filtering aid agent. The drying of the condensed matter and the filter allows the condensed matter deposited on the filter to be easily removed by means of mechanical vibrations or compressed air. As a result, it is possible to more effectively and quickly process the waste gas. The above-described air is preferably introduced directly into the filtering and dust collecting unit via a path different from that for the flow of the waste gas. Furthermore, the air is preferably introduced into the filtering and dust collecting unit via an inlet disposed lower than the filter, that is, it is preferable to introduce the air into an upstream region, so as to prevent any condensed matter which is not dried from being captured by the filter.

In the present invention, it is possible to employ a proper combination of: the process of adding a filtering aid agent into the path of the flow of the waste gas exhausted from CVD equipment or directly into the filtering and dust collecting unit so that the waste gas comes in contact with the filtering aid agent; the process of pre-coating the filter in the filtering and dust collecting unit with a filtering aid agent; the process of introducing air for diffusing the filtering aid agent when the pre-coating is performed; and the process of introducing air into the filtering and dust collecting unit so as to dry the filter and the condensed matter.

EXAMPLES

Referring to the accompanying drawings, the method and apparatus of the invention will be described below in a more specific fashion.

Example 1

(Waste gas is mixed with a filtering aid agent.)

FIG. 1 is a schematic diagram of an apparatus for processing the waste gas exhausted from CVD equipment according to the present invention.

As shown in FIG. 1, the waste gas exhausted from CVD equipment 1 is transported to a circulating and mixing unit 3. A filtering aid agent is continuously or at predetermined intervals supplied to the circulating and mixing unit 3 from a filtering aid agent supplying unit 2. In the circulating and mixing unit 3, dust and/or viscous substances in the waste gas are condensed onto the filtering aid agent, and extracted to a filtering and dust collecting unit 4. Inside the filtering and dust collecting unit 4 is provided a filter for separating solids from gas. The dust and/or viscous substances condensed on the filtering aid agent are deposited on the surface of the filter. The condensed substances deposited on the surface of the filter are removed by opening a compressed gas regulator valve 8 disposed at an upper part of the filtering and dust collecting unit 4 thereby introducing an inert gas such as nitrogen gas or air into the filtering and dust collecting unit 4 and thus back-washing the filter.

A dust exhausting mechanism 6 disposed at a lower part of the filtering and dust collecting unit 4 is opened and the condensed substances removed from the filter are exhausted to the outside of the system through the dust exhausting mechanism 6. In the above process, if a particle circulation regulator valve 5 is also opened, the filtering aid agent, together with the waste gas, is recycled back to the circulating and mixing unit 3 and mixed again with the waste gas containing dust and/or viscous substances.

In the meantime, the solid components of the waste gas are removed by the solid-gas separation process of the filtering and dust collecting unit 4 and the remaining waste gas is sent to a gas processing tower 7. The gas processing tower 7 removes hazardous gas components from the waste gas so that the waste gas is completely detoxified. The now harmless waste gas is released to the atmosphere through an exhaust fan 9. The gas processing tower 7 has no special limitations, and any known gas processing tower may be employed.

Example 2

(The filtering aid agent is pre-coated, and no air is introduced.)

Figure 2:
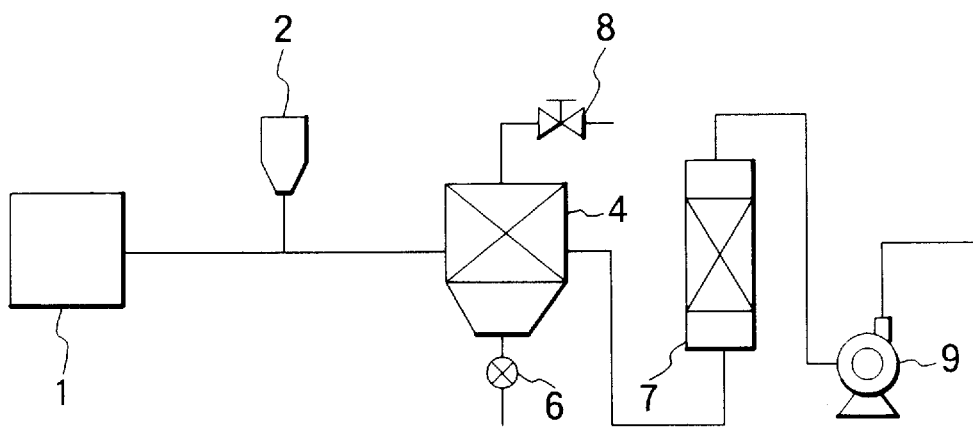
FIG. 2 is a schematic diagram of another embodiment of an apparatus for processing waste gas exhausted from CVD equipment according to the present invention.

FIG. 2 is a schematic diagram of another embodiment of an apparatus for processing the waste gas exhausted from CYD equipment according to the present invention. This apparatus for processing the waste gas exhausted from CYD equipment is the same as that shown in FIG. 1 except that the circulating and mixing unit 3 and the particle circulation regulator valve 5 are removed so that the apparatus operates as a batch-type device.

In FIG. 2, a filtering aid agent supplying unit 2 supplies a suitable amount of filtering aid agent so that the surface of a filter of a filtering and dust collecting unit 4 is coated with the filtering aid agent. Next, the waste gas exhausted from CVD equipment is introduced into the system for processing. The dust and/or viscous substances contained in the waste gas are condensed and deposited on and in the filtering aid agent coated on the filter.

When the amount of the dust and/or viscous substances deposited on the surface of the filter has reached a certain value, a compressed gas regulator valve 8 disposed at an upper part of the filtering and dust collecting unit 4 is opened so that an inert gas such as nitrogen gas or air is introduced into the filtering and dust collecting unit 4 thereby back-washing the filter and thus removing the condensed substance. The removed filtering aid agent is exhausted to the outside of the system through a dust exhausting mechanism 6. On the completion of the exhausting, a necessary amount of filtering aid agent is again supplied for next pre-coating process from the filtering aid agent supplying unit 2, and the above-described process is repeated.

The particle size of the filtering aid agent used for the pre-coating is preferably selected according to the mesh size of the filter and the particle size of dust contained in the waste gas so that the dust can be efficiently collected without having problems regarding clogging of the filter and so that the filtering aid agent may have a longer life.

Example 3

Using the apparatus, shown in FIG. 1, for processing the waste gas exhausted from the CVD equipment, a waste gas processing test was performed as described below.

First, a silicon (Si) substrate was placed in the CVD equipment (atmospheric-pressure CVD equipment) 1, and heated to 400° C. by a heater. Then, TEOS (tetraethoxysilane) heated at 65° C. and phosphorus- and boron-based source materials bubbled with nitrogen gas at a rate of 3 l/min were introduced, together with a carrier gas, into the CVD equipment. A gas mixture of $O_3/O_2$ was also introduced via an ozonizer so that a film was formed. The waste gas which was exhausted during the above film deposition process was processed using the waste gas processing apparatus shown in FIG. 1.

First, the filtering aid agent supplying unit 2 was charged with a filtering aid agent such as perlite, diatomaceous earth, or activated carbon, with a particle size of 5 to 40 $\mu$m. The exhaust fan 9 was then started so that it operated at an exhausting rate of 2 to 3 $m^3$/min. 1000 g of filtering aid agent was supplied to the circulating and mixing unit, and then the supplying of the waste gas of the CVD equipment was begun. During the operation, the filtering aid agent was supplied from the filtering aid agent supplying unit 2 at a rate of 10 g/hr in a continuous or intermittent fashion. The dust and/or viscous substances which were condensed and deposited on the filtering aid agent were introduced into the filtering and dust collecting unit 4 with a filter area of 1 $m^2$ so that the dusty and/or viscous substances were deposited on the surface of the filter. The condensed matter deposited on the filter was removed by performing back-washing every 30 to 360 sec using nitrogen gas introduced via the compressed gas regulator valve 8. The filtering aid agent containing the dust and/or viscous substances (condensed matter) was recovered via the dust exhausting mechanism at a rate of 20 g/hr.

Next, the pressure difference between the circulating and mixing unit 3 and the filtering and dust collecting unit 4 was measured. The pressure difference between the filtering and dust collecting unit 4 and the gas processing tower 7 was also measured. The pressure loss was determined on the basis of this data. When the processing apparatus having the filtering aid agent supplying unit 2 and the circulating and mixing unit 3 according to the present invention was used, the pressure loss of the filter was still less than 50 mmaq after a 350-hrs operation, and the apparatus was able to further continue processing. In contrast, when the filtering aid agent supplying unit 2 and the circulating and mixing unit 3 were not used, the pressure loss of the filter became as great as 150 mmaq after a 170-hrs operation, and thus it became difficult to further carry out the processing of the waste gas.

Example 4

Using the apparatus shown in FIG. 2 for processing the waste gas exhausted from the CVD equipment, a waste gas processing test was performed as described below.

First, a silicon (Si) substrate was placed in CVD equipment (atmospheric-pressure CVD equipment) 1, and heated up to 400° C. by a heater. Next, TEOS (tetraethoxysilane) heated at 65° C. and phosphorus- and boron-based source materials bubbled with nitrogen gas flowing at a rate of 3 l/min were introduced, together with a carrier gas, into the CVD equipment. A gas mixtures of $O_3/O_2$ was also introduced via an ozonizer so that a film was formed. The waste gas which was exhausted during the above film deposition process was processed using the waste gas processing apparatus shown in FIG. 2.

First, the filtering aid agent supplying unit 2 was charged with a filtering aid agent such as perlite, diatomaceous earth, or activated carbon, with a particle size of 5 to 40 μm. The exhaust fan 9 was then started so that it operated at an exhausting rate of 1 m³/min. 500 g of filtering aid agent was supplied to the filtering and dust collecting unit 4 with a filter area of 1 m² so that the surface of the filter was pre-coated with the filtering aid agent.

The waste gas of the CVD equipment 1 was supplied to the waste gas processing apparatus, so that dust and viscous substances were condensed and deposited on and in the filtering aid agent. The time required for the pressure loss of the filter to become 150 mmaq was measured. Then nitrogen gas was introduced via the compressed gas regulator valve 8 so that the filter was back-washed thereby removing the deposited matter. The removed filtering aid agent containing the condensed dust and/or viscous substances (condensed substances) was released outside of the system via the dust exhausting mechanism 6.

On completion of the release, another 500 g of filtering aid agent was supplied to the filtering and dust collecting unit 4 from the filtering aid agent supplying unit 2 so that the surface of the filter was pre-coated with the filtering aid agent. Then the above-described operation was repeated. In this way, the time required for the pressure loss of the filter to become 150 mmaq was measured three times. The results are shown below together with the results for the case where no pre-coating was performed.

| Operation | 1st | 2nd | 3rd |
| --- | --- | --- | --- |
| Time (in hours, no pre-coating) | 167 | 74.9 | 64.9 |
| Time (in hours, with pre-coating) | 175 | 167 | 167 |

Example 5

(The filtering aid agent is pre-coated, air is introduced, and hot air may be introduced.)

Figure 3:
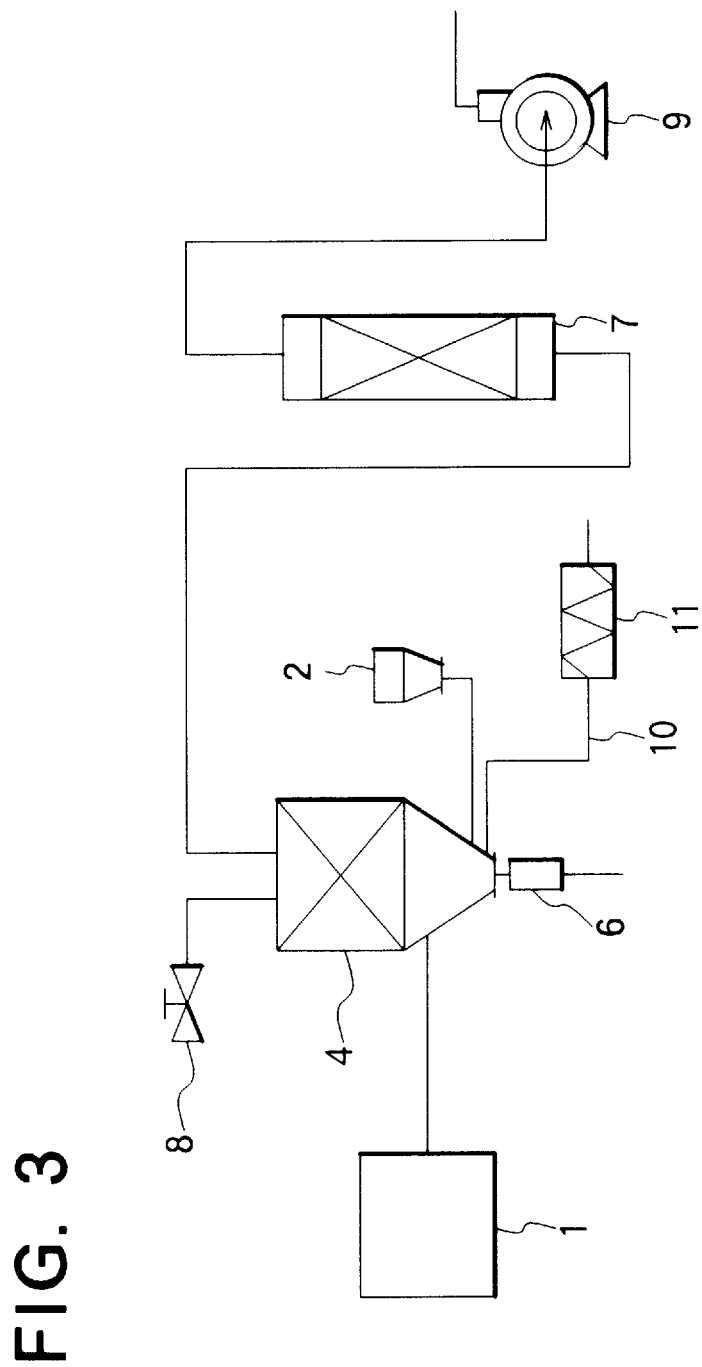
FIG. 3 is a schematic diagram of still another embodiment of an apparatus for processing waste gas exhausted from CVD equipment according to the present invention.

FIG. 3 is a schematic diagram of still another embodiment of an apparatus for processing the waste gas exhausted from CVD equipment, according to the present invention.

In FIG. 3, a filtering aid agent supplying unit 2 is connected in a lower region of the main part of a filtering and dust collecting unit 4. The filtering aid agent supplying unit 2 is adapted to supply a required amount of filtering aid agent to the filtering and dust collecting unit 4. When the filter in the filtering and dust collecting unit 4 is to be pre-coated, the filtering aid agent supplying unit 2 supplies a required amount of filtering aid agent to the filtering and dust collecting unit 4 so that the surface of the filter is coated with the filtering aid agent. During the above pre-coating process, air is also introduced into the filtering and dust collecting unit 4 via an air inlet 10 disposed at a location lower than the connection for the filtering aid agent supplying unit 2, so that the filtering aid agent is diffused.

After the pre-coating of the filtering aid agent on the filter of the filtering and dust collecting unit 4, the waste gas exhausted from the CVD equipment is introduced and processed in the filtering and dust collecting unit 4. During this processing, air is also introduced into the filtering and dust collecting unit 4 via the air inlet 10 so as to dry the filter, the condensed filtering aid agent, and the condensed matter containing dust and/or viscous substances. The air supplied via the air inlet 10 may be heated as required by a heater 11 connected to the air inlet 10. As for the air inlet 10, either one air inlet or a plurality of air inlets may be employed.

In the inside of the filtering and dust collecting unit 4, there is provided a filter for separating solids from gas. The dust and/or viscous substances condensed on the filtering aid agent are deposited on the surface of the filter. When the amount of the dust and/or viscous substances deposited on the surface of the filter has reached a certain value, a compressed gas regulator valve 8 disposed at an upper part of the filtering and dust collecting unit 4 is opened so that an inert gas such as nitrogen gas or air is introduced into the filtering and dust collecting unit 4 thereby back-washing the filter and thus removing the condensed matter from the filter. The thus removed condensed matter is released outside of the system through a dust exhausting mechanism 6. If a pre-coating process is again desired after the release of the condensed matter, a required amount of filtering aid agent is supplied from the filtering aid agent supplying unit 2, and the above-described process is repeated.

Example 6

A silicon (Si) substrate was placed in the CVD equipment (atmospheric-pressure CVD equipment) 1 shown in FIG. 3, and heated to 400° C. by a heater. Then, TEOS (tetraethoxysilane) heated at 65° C. and phosphorus- and boron-based source materials bubbled with nitrogen gas at a rate of 6 l/min were introduced, together with a carrier gas, into the CVD equipment. A gas mixture of $O_3/O_2$ was also introduced via an ozonizer so that a film was formed. The waste gas which was exhausted during the above film deposition process was processed using the waste gas processing apparatus shown in FIG. 3.

First, the filtering aid agent supplying unit 2 was charged with a filtering aid agent (perlite) with an average particle size of 5 to 40 μm. The exhaust fan 9 was then started so that it operated at an exhausting rate of 1.5 m$^3$/min. 100 g of filtering aid agent was supplied to the filtering and dust collecting unit 4 with a filter area of 1 m$^2$ and air was also introduced via the air inlet 10 so as to diffuse the filtering aid agent thereby pre-coating the surface of the filter.

The waste gas was then supplied from the CVD equipment 1. Air heated at 80° C. was also introduced via the air inlet 10 so as to dry the condensed matter and the filter. The waste gas was processed, and the pressures at the filter inlet and outlet were measured, and the pressure difference was determined. The pressure loss immediately before the back-washing of the filter was determined on the basis of the above data. Next, nitrogen gas was introduced via the compressed gas regulator valve 8 so that the filter was back-washed thereby removing the deposited matter. The removed filtering aid agent containing the condensed dust and viscous substances (condensed matter) was released outside of the system via the dust exhausting mechanism 6.

On completion of the release, another 100 g of filtering aid agent was supplied to the filtering and dust collecting unit 4 from the filtering aid agent supplying unit 2 so that the surface of the filter was pre-coated with the filtering aid agent, and the above-described operation was repeated. The apparatus was operated for 20 hrs, and the pressure loss immediately before the back-washing of the filter was measured. Next, the back-washing was performed. These processing steps were repeated for a total of 140 hrs. The results are shown in the following table, in which the results for the case where no pre-coating was performed, that is, where there was no filtering aid agent, are also shown.

| Processing Time (hr) | 20 | 40 | 60 | 80 | 100 | 120 | 140 |
|---|---|---|---|---|---|---|---|
| With Pre-Coating (mmaq) | 45 | 46 | 66 | 65 | 70 | 69 | 70 |
| Without Pre-Coating (mmaq) | 45 | 120 | 171 | Processing not possible | | | |

Pressure loss was also measured immediately after the back-washing of the filter. Furthermore, another test was also performed in the same manner as the above test except that no hot air was introduced via the air inlet 10, and pressure loss was measured immediately after the back-washing of the filter.

| Processing Time (hr) | 0 | 20 | 40 | 60 | 80 |
|---|---|---|---|---|---|
| With Hot Air (mmaq) | 2.0 | 2.0 | 2.0 | 2.0 | 2.0 |
| Without Hot Air (mmaq) | 2.0 | 2.5 | 3.0 | 3.5 | 4.5 |

In the above tests, the condensed matter released from the dust exhausting mechanism 6 was compared. In the case where no hot air was introduced, the condensed matter was wet and viscous. Furthermore, the filter in the filtering and dust collecting unit 4 was also wet. On the other hand, where hot air was introduced, both the condensed matter and the filter were dry.

To evaluate the efficiency of the pre-coating, the following test was performed. First, the filtering aid agent supplying unit 2 was charged with a filtering aid agent (perlite) with an average particle size of 5 to 40 μm. The exhaust fan 9 was then started so that it operated at an exhausting rate of 1.5 m$^3$/min. 100 g of filtering aid agent was supplied to the filtering and dust collecting unit 4 with a filter area of 1 m$^2$ and air was also introduced via the air inlet 10 so as to diffuse the filtering aid agent thereby pre-coating the surface of the filter.

After completion of the pre-coating, the filtering aid agent, which was not pre-coated and deposited on the bottom of the filtering and dust collecting unit 4, was withdrawn through the dust exhausting mechanism 6, and measured.

For the purpose of comparison, the amount of filtering aid agent withdrawn was also measured for the case where no air was introduced via the air inlet 10. The results are shown below.

| | Amount of Withdrawn Agent | Pre-Coating Efficiency |
|---|---|---|
| With Air | 5.2 g | 94.8% |
| Without Air | 38.9 g | 61.1% |

Example 7

(Pre-coating is not performed, and hot air is introduced.)

Figure 4:
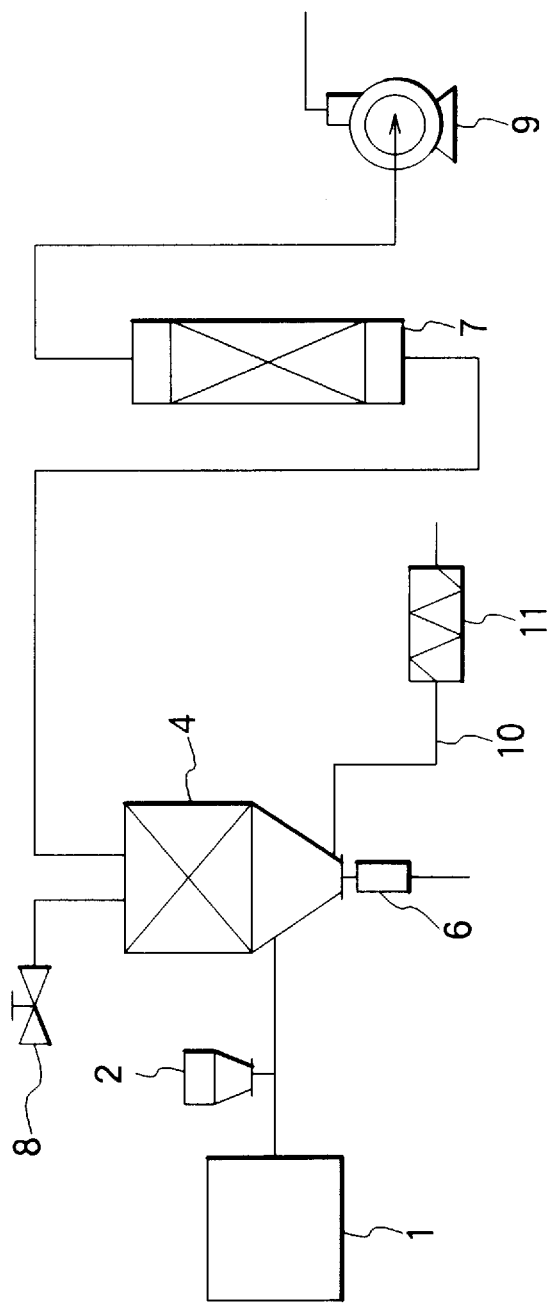
FIG. 4 is a schematic diagram of a further embodiment of an apparatus for processing waste gas exhausted from CYD equipment according to the present invention.

To evaluate the effect of hot air for the case where no pre-coating is performed, a waste gas processing test was performed using a waste gas processing apparatus for the CYD equipment as shown in FIG. 4. The waste gas processing apparatus for CVD equipment shown in FIG. 4 is substantially the same as that shown in FIG. 3 except that the filtering aid agent supplying unit 2 is disposed in the path of the waste gas between the CVD equipment 1 and the filtering and dust collecting unit 4.

In FIG. 4, the waste gas exhausted from the CVD equipment 1 is sent to the filtering and dust collecting unit 4 via the waste gas path. The filtering aid agent supplying unit 2 supplies a filtering aid agent continuously or intermittently. Dust and viscous substances in the waste gas are condensed on the filtering aid agent and deposited on the surface of a filter in the filtering and dust collecting unit 4. Air heated by a heater 11 is introduced via an air inlet 10 of the filtering and dust collecting unit 4 so as to dry the filter and the condensed matter containing the condensed filtering aid agent, dust, and viscous substances. Inside the filtering and dust collecting unit 4, there is provided a filter for separating solids from gases. The dust and viscous substances condensed on the filtering aid agent are deposited on the surface of the filter. When the amount of condensed matter deposited on the surface of the filter has reached a certain value, a compressed gas regulator valve 8 disposed at an upper part of the filtering and dust collecting unit 4 is opened so that an inert gas such as nitrogen gas or air is introduced into the filtering and dust collecting unit 4 thereby back-washing the filter and thus removing the condensed matter from the filter. The removed condensed matter is released outside of the system through a dust exhausting mechanism 6.

Using the above-described waste gas processing apparatus for CVD equipment, a waste gas processing test was performed under the same conditions as those of Example 6 above.

First, the filtering aid agent supplying unit 2 was charged with a filtering aid agent (perlite) with a mean particle size of 5 to 40 μm. The exhaust fan 9 was then started so that it operated at an exhausting rate of 1.5 m³/min. A filtering aid agent was added intermittently to the flowing waste gas at a rate of 10 g/hr via the filtering aid agent supplying unit 2. The dust and viscous substances condensed and deposited on the filtering aid agent were introduced to the filtering and dust collecting unit 4. Air heated at 80° C. by a heater 11 was introduced via an air inlet 10 into the filtering and dust collecting unit 4. In this way, processing was performed for 20 hrs.

After that, nitrogen gas was introduced via the compressed gas regulator valve 8 so that the filter was back-washed thereby removing the deposited matter. Immediately after back-washing, pressure loss was measured. The removed filtering aid agent containing the condensed dust and viscous substances (condensed matter) was then released to the outside of the system via the dust exhausting mechanism 6.

After completing of the release of the condensed matter, the above operation was immediately repeated and another 20-hrs operation was performed. The operation was performed repeatedly for a total of 80 hrs. Furthermore, operations were also performed in a manner similar to the above except that no hot air was introduced via the air inlet 10, and pressure loss was measured immediately after back-washing of the filter.

| Processing Time (hr) | 0 | 20 | 40 | 60 | 80 |
|---|---|---|---|---|---|
| With Hot Air (mmaq) | 2.0 | 2.5 | 3.0 | 3.0 | 3.5 |
| Without Hot Air (mmaq) | 2.0 | 3.5 | 5.0 | 6.0 | 8.0 |

In the above tests, condensed matter extracted from the dust exhausting mechanism 6 was compared. When no hot air was introduced, the condensed matter was wet and viscous as in Example 6. Furthermore, the filter in the filtering and dust collecting unit 4 was also wet. On the other hand, in the case where hot air was introduced, both the condensed matter and the filter were dry.

In the method and apparatus of the present invention, as described above, waste gas containing dust and/or viscous substances exhausted from CVD equipment is contacted with a filtering aid agent so that the dust and/or viscous substances are together with the filtering aid agent, condensed and released outside via a filtering and dust collecting unit. As a result, the amount of dust and/or viscous substances which comes in direct contact with the filter is greatly reduced or becomes nil. Therefore, clogging of the filter no longer occurs, and it possible to effectively and quickly process the waste gas exhausted from CVD equipment.

What is claimed is:

1. A method of processing waste gas exhausted from chemical vapor deposition equipment, which comprises:

a) contacting a waste gas containing viscous substances with a filtering aid agent;

b) passing the waste gas containing said viscous substances exhausted from the chemical vapor deposition equipment, and which has been contacted with said filtering aid agent, through a filtering and dust collecting unit, whereby said viscous substances are condensed with said filtering aid agent on said filtering and dust collecting unit; and c) removing the condensed matter from the surface of the filter, thereby preventing clogging thereof; and wherein said viscous substances are selected from the group consisting of lower alcohols, lower aldehydes, silicon compounds, boron compounds and phosphorus compounds which are by-products of chemical vapor deposition; and wherein said filtering aid agent is selected from the group consisting of perlite and diatomaceous earth having a particle size of from about 5 to 40 μm.

2. The method of claim 1, wherein the filtering aid agent is added to and mixed together with the waste gas upstream of said filtering and dust collecting unit.

3. The method of claim 2, wherein said filtering aid agent is supplied continuously or added at fixed intervals.

4. The method of claim 1, wherein the filtering aid agent is circulated so as to be recycled.

5. The method of claim 1, wherein the filter of said filtering and dust collecting unit is back-washed by introducing compressed gas or mechanical vibration.

6. The method of claim 1, wherein said filter of said filtering and dust collecting unit is coated with said filtering aid agent.

7. The method of claim 1, wherein said filter of said filtering and dust collecting unit is made of synthetic fibers, glass fibers or wire mesh.

8. The method of claim 5, wherein said filter is back-washed by introducing compressed nitrogen gas.

* * * * *